US007215926B2

(12) United States Patent
Corbett et al.

(10) Patent No.: US 7,215,926 B2
(45) Date of Patent: May 8, 2007

(54) ENHANCED MODE TECHNIQUE FOR GROWING MESH NETWORKS

(75) Inventors: Christopher J. Corbett, Duvall, WA (US); Amer Hassan, Kirkland, WA (US); Salim S. AbiEzzi, Sammamish, WA (US); Warren V. Barkley, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 10/729,808

(22) Filed: Dec. 5, 2003

(65) Prior Publication Data
US 2005/0124346 A1 Jun. 9, 2005

(51) Int. Cl.
*H04B 7/00* (2006.01)
(52) U.S. Cl. ............... 455/41.2; 455/41.3; 455/446; 455/435.2; 455/450; 455/455; 455/562.1; 370/334
(58) Field of Classification Search ......... 455/562.1, 455/561, 456.2, 435.2, 450–452, 455, 41.2; 370/334, 330, 329, 338, 347, 400; 342/354, 342/367–368, 371
See application file for complete search history.

(56) References Cited

U.S. PATENT DOCUMENTS

| | | | | |
|---|---|---|---|---|
| 5,303,240 | A * | 4/1994 | Borras et al. ............... 370/347 |
| 5,488,737 | A * | 1/1996 | Harbin et al. ............. 455/562.1 |
| 5,924,040 | A * | 7/1999 | Trompower ............... 455/456.2 |
| 6,236,866 | B1 * | 5/2001 | Meyer et al. ............. 455/562.1 |
| 6,498,939 | B1 * | 12/2002 | Thomas ................... 455/562.1 |
| 6,694,154 | B1 * | 2/2004 | Molnar et al. ............. 455/562.1 |
| 6,757,553 | B1 * | 6/2004 | English ................... 455/562.1 |
| 6,778,844 | B2 * | 8/2004 | Hood, III ................. 455/562.1 |
| 6,850,502 | B1 * | 2/2005 | Kagan et al. ................ 370/330 |
| 2003/0048770 | A1 * | 3/2003 | Proctor, Jr. ................. 370/349 |
| 2003/0083104 | A1 * | 5/2003 | Lohman et al. ............. 455/562 |
| 2003/0152086 | A1 * | 8/2003 | El Batt ....................... 370/400 |
| 2004/0063438 | A1 * | 4/2004 | Hsu et al. ................. 455/452.1 |
| 2004/0106436 | A1 * | 6/2004 | Ochi et al. ............... 455/562.1 |

OTHER PUBLICATIONS

Bommaiah, Ethendranath et al., "AmRoute : Adhoc Multicast Routing Protocol," Internet-Draft, http://www.icir.org/yoid/otherProj/draft-talpade-manet-amroute-00.txt, Aug. 6, 1998, 23 pages.

* cited by examiner

Primary Examiner—Steve M. D'Agosta
(74) Attorney, Agent, or Firm—Wolf, Greenfield & Sacks, P.C.

(57) ABSTRACT

A wireless device and method provides for adding nodes to a wireless mesh network by adjusting an antenna sensitivity pattern of one or more nodes in the wireless mesh network to exhibit spatial selectivity. The method transmits a query, and if a response is received within a predetermined time period, the wireless device receives the response and adds the responding wireless device to the mesh network. The wireless device can adjust the transmission pattern to enable the antenna sensitivity pattern to cover a predetermined spatial area, and the predetermined time period can be fixed. The wireless devices can adjust the antenna sensitivity pattern in a coordinated manner. A method for supporting data connections between three or more wireless devices includes adjusting the sensitivity pattern of an antenna on a first wireless device, communicating with a second wireless device, and further adjusting the sensitivity pattern of the antenna for more wireless devices.

15 Claims, 7 Drawing Sheets

ENHANCED MODE TECHNIQUE FOR GROWING MESH NETWORKS

FIELD OF THE INVENTION

This invention relates generally to computer systems and, more particularly, relates to differentiation for quality of service of computer systems and computer devices, mesh networking, smart antennas, radio frequencies in any spectrum or directed radio frequencies.

BACKGROUND OF THE INVENTION

Wireless networks are becoming more and more popular. With the popularity of wireless networks increasing, users also demand broader coverage from a wireless network, such as voice, video and data communication support. With the broader demands placed on wireless networks, more complex mechanisms are required for differentiated services.

One solution for meeting the broader demands of wireless networks resulted in an increased interest in mesh networking in the home. A typical audio/visual cluster in the home could include a collection of home entertainment appliances that need to connect with each other. Home entertainment appliances can include an instance in the living room, an HDTV, stereo speakers, possibly an amplifier, and a set top box for distribution. Another example is the PC cluster; such a cluster can consist of a PC with a DVD Jukebox, a tuner, a second DVD R/W, and a printer.

In metropolitan areas, the use of wireless access points is growing. Already the market is seeing the emergence of informal federation of access points to constitute larger coverage mesh networks. Each access point deployed can be considered a candidate node in proximity mesh networks, whether at the metropolitan scale or the scale of a home-owner's residence. These examples of mesh networking require reliable connectivity among the network nodes. Rather than the cumbersome wired connections, wireless connectivity with auto configuration results in a much better user experience and therefore an accelerated growth of a mesh networking footprint.

Wireless connectivity is an essential element to low cost, ease of use mesh networking. A promising wireless technology to enable the connectivity of these clusters is Wi-Fi. Wi-Fi is a technology that operates in the unlicensed part of the radio spectrum and is based on the existing IEEE 802.11 Standard. The cost of Wi-Fi devices is dropping to become a commodity element in consumer electronics devices as well as an integral part of personal computers.

There is a critical issue that must be solved for wireless mesh networking to be a viable scenario: how to grow a mesh network which inherently is an unmanaged network in the traditional sense. Mesh networks tend to be "best effort" deployment, therefore locating and connecting to other nodes within a certain proximity requires a special act on the part of the access point which constitutes a node in an existing mesh network.

A problem with mesh networks is that changes in local connectivity, even brief incidental changes, such as a dog walking in front of an access point, can result in disruptions in connectivity. If only a small number of nodes are present in the network, this disruption in connectivity can interrupt some nodes ability to reach the greater internet.

BRIEF SUMMARY OF THE INVENTION

Mesh networks can be used to simplify the installation of wireless devices by obviating the need to connect every wireless node to a wired network. In a mesh network, only a subset of the wireless nodes need to be connected to a wired network. Those not connected to a wired network will relay the received data packets to other wireless nodes. The packets are relayed in such a manner until the packet reaches a wireless node with a wired connection to the broader internet. This allows many wireless nodes to be added to the network without the need to add wired connections for each wireless node.

In addition to the advantage of not having to add a wired connection to each wireless node, mesh networks have the advantage that a single point of failure will not generally cause a network failure. In present WiFi networks, if a single wireless node fails, even if the failure is due to a change in the radio propagation environment, the network will fail. In a mesh network, the network can reconfigure to the pattern used to pass packets, referred to as hops, and route the packets around the failed node.

Mesh networks can also greatly increase coverage because many wireless nodes can be used with overlapping coverage areas. The overall coverage will consist of the coverage area of all the wireless nodes instead of that provided by a single wireless node.

The overall reliability and coverage of a wireless mesh network is dependent on the number of wireless nodes that can be incorporated into the mesh network. Therefore, a mesh network which is capable of adding more wireless nodes to the network is more reliable and provides greater coverage than a similar network which is not capable of adding these additional wireless nodes.

A limitation on the number of wireless nodes that can be added to the mesh network is the limited range of WiFi devices. A wireless node which is just beyond the range of any wireless node and is a member of the mesh network can not be added to the network. If this range could be extended, then the number of wireless nodes in a mesh network could be increased. Therefore, a need exists to extend the range of WiFi devices to allow the incorporation of additional wireless nodes in a mesh network.

Range can be extended by the use of directional antennas. These antennas concentrate the radiation pattern of a transmitting device in a given direction. By concentrating the radiation pattern, the power transmitted is concentrated in a given direction at the expense of other directions. If a device exists in the direction to which the power is concentrated, this device will receive a stronger signal and will therefore be more likely to receive the transmission. Because of reciprocity theory, if the roles of the transmitting and receiving devices are reversed, the radio link will realize the same range advantages due to the directional effects of the antenna now on the receiving device as were initially realized on before the reversal of roles.

The difficulty in using directional antennas is determining the direction in which the antenna should bias the transmission pattern. This is accomplished by systematically changing the direction of the bias and transmitting a query. If a device answers the query, then this bias is recorded and the answering wireless node will be invited to join the network.

A second problem is determining which wireless nodes should attempt to add additional wireless nodes to the mesh network. In general, if a wireless node is receiving signals from a wide range of directions, the wireless node is probably in the middle of a well established network.

Wireless nodes which are just out of range of a second wireless node that is already a part of the network do not need to use directional techniques to add this second wireless node. However, wireless nodes which are not connected to the mesh network by devices in a given direction are most likely at the edge of the network and can more probably grow the network by searching for devices in the direction in which no connectivity exists through the use of directional antennas.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

DETAILED DESCRIPTION OF THE INVENTION

Figure 1:
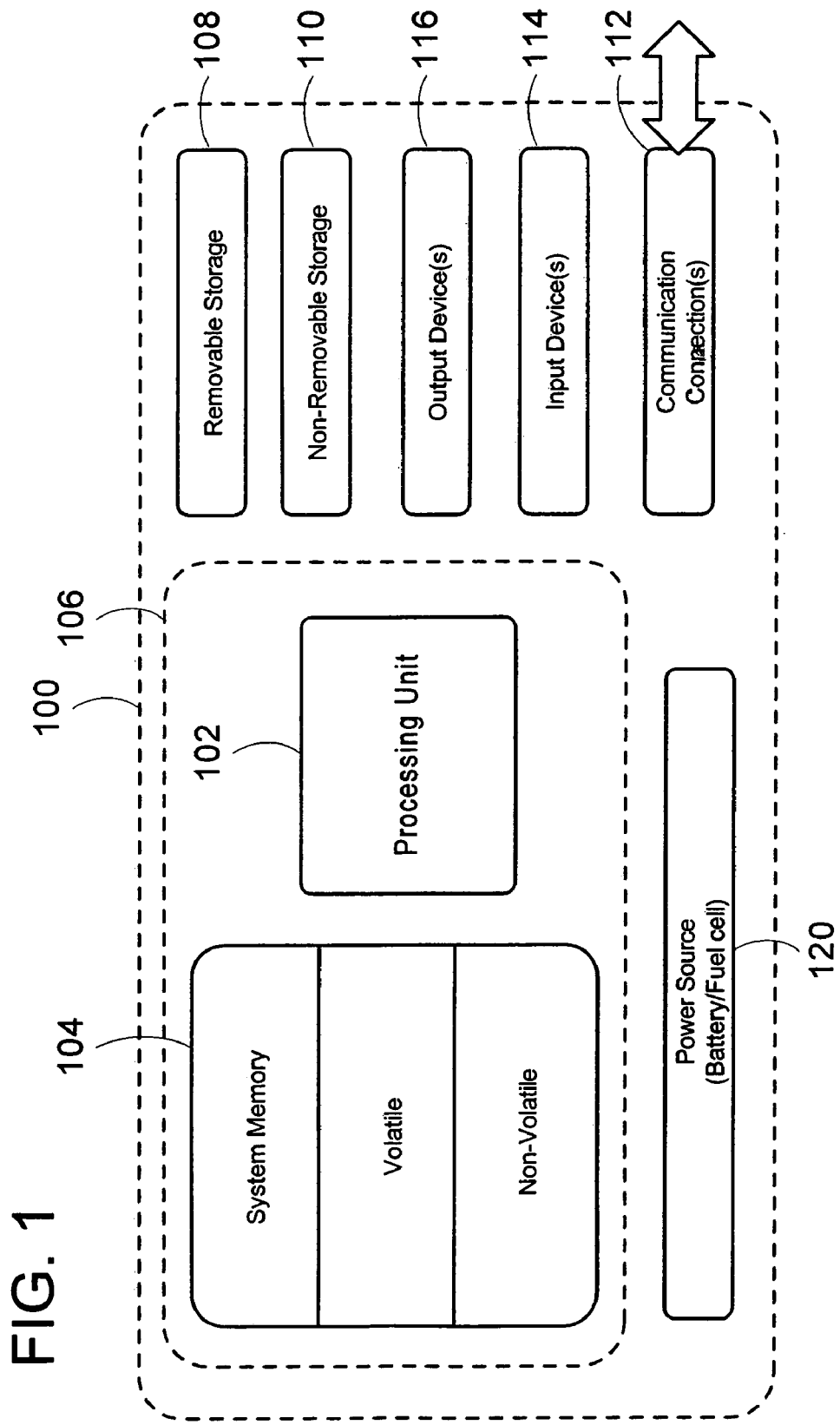
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

The invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

FIG. 1 shows an exemplary computing device 100 for implementing one or more embodiments of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. The basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

Device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

In keeping with the intended application of the invention, device 100 is configured as a wireless mobile device. To that end, device 100 is provided with a portable power source 120, such as a battery pack, a fuel cell, or the like. The power source 120 provides power for computations and wireless data transmissions by the device 100.

Figure 2:
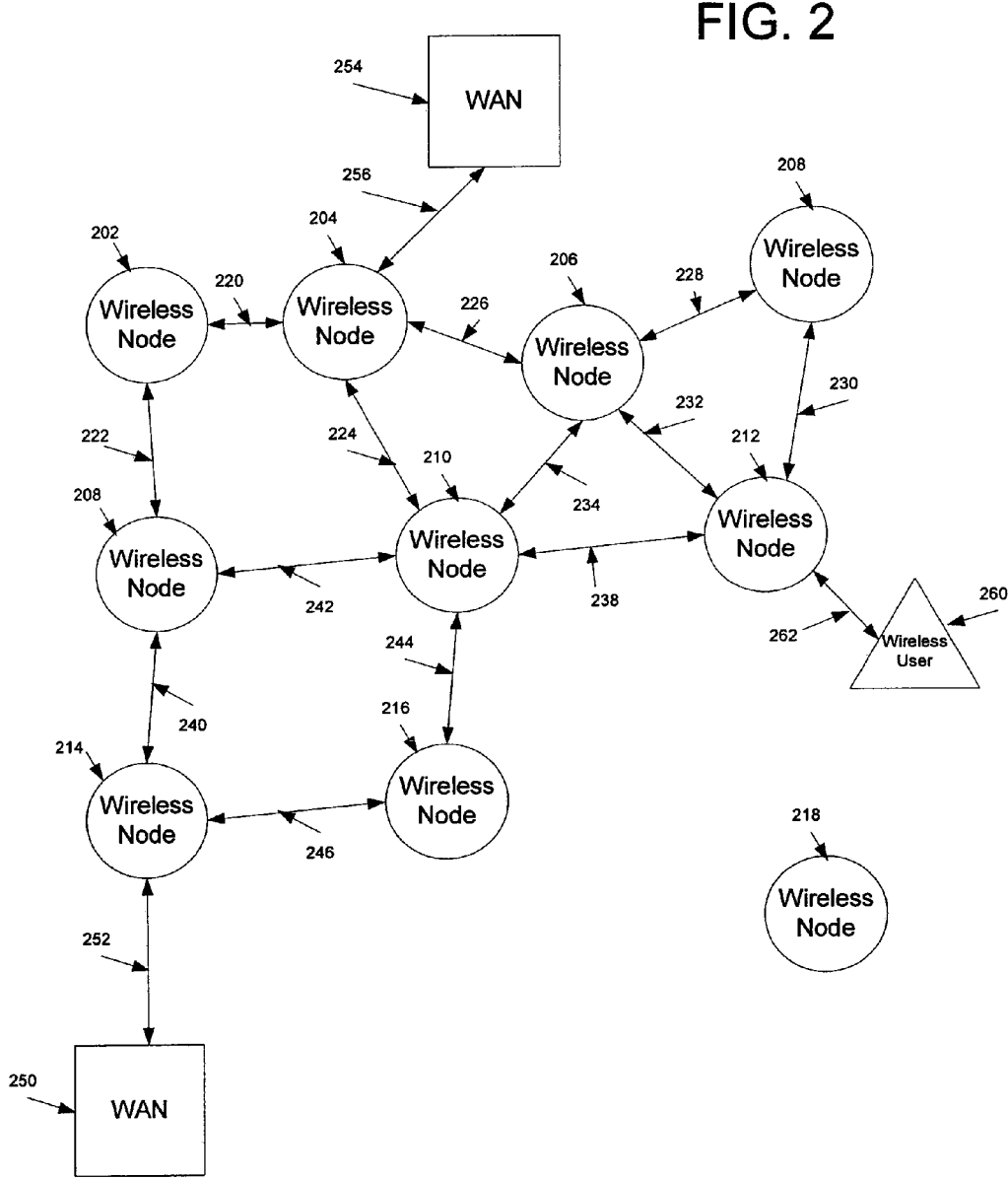
FIG. 2 is a block diagram of a wireless mesh network.

FIG. 2 illustrates a typical wireless mesh network. Wireless nodes 202–218 could be access points in a WiFi network or another type of wireless communication network, such as Ultra Wide Band (UWB) or the like, as will be appreciated by those of skill in the art with the benefit of this disclosure. Wireless nodes 202–218 have limited range and therefore can only establish communications with other wireless nodes that are in close physical proximity. Wireless connections between wireless nodes are represented by connections 220–246. Wireless nodes 204 and 214 are connected to wide area wired networks 250 and 254 through wired connections 252 and 256. These WANs could provide connectivity to corporate networks or the internet, for example.

In the wireless mesh network 200 wireless nodes 202–216 can all communicate with WAN 250 and 254 even though not all of these wireless nodes are directly connected to these WANs. Consider, for illustrative purposes, a wireless client 260 with wireless connection 262 to wireless node 212 which is attempting to access the internet which is available through WAN 254.

In a wireless mesh network, wireless client 260 will send a data packet to wireless node 212. Wireless node 212 will examine the packet and determine that the packet is destined for the internet. While wireless node 212 does not have a direct connection to the internet, in a mesh network packets are relayed from one node to the next until the packet can be sent to WAN 254. For example, the packet may be passed from wireless node 212 to wireless node 210 over wireless connection 238, then to wireless node 204 over wireless connection 224, and then to WAN 254 over wired connection 256. The path taken by the packet is referred to as a route.

Many algorithms have been proposed to determine the optimal, or at least an acceptable route, for a given packet are known in the art. The method by which this route is determined is important to the overall performance of a wireless mesh network. However, the choice of routing algorithm is not salient to the present invention.

Referring to FIG. 2, wireless node 218 is not within range of any other wireless node and therefore cannot be added to the mesh network. However, if the range of wireless node could be extended it might be possible to add wireless node 218 to the network.

One method by which the range of a wireless node can be extended is through the use of directional antennas. It is well known in the art that antennas can be designed which favorably transmit signals in a given direction at the expense of other directions. When such an antenna is employed, the transmitted power is concentrated in a given direction and the range of the transmission in this favored direction is extended, while in directions other than the favored direction the range is reduced. It can also be shown that the advantage in transmit range is identically realized when receiving signals. This property of antennas is known as reciprocity.

Figure 3:
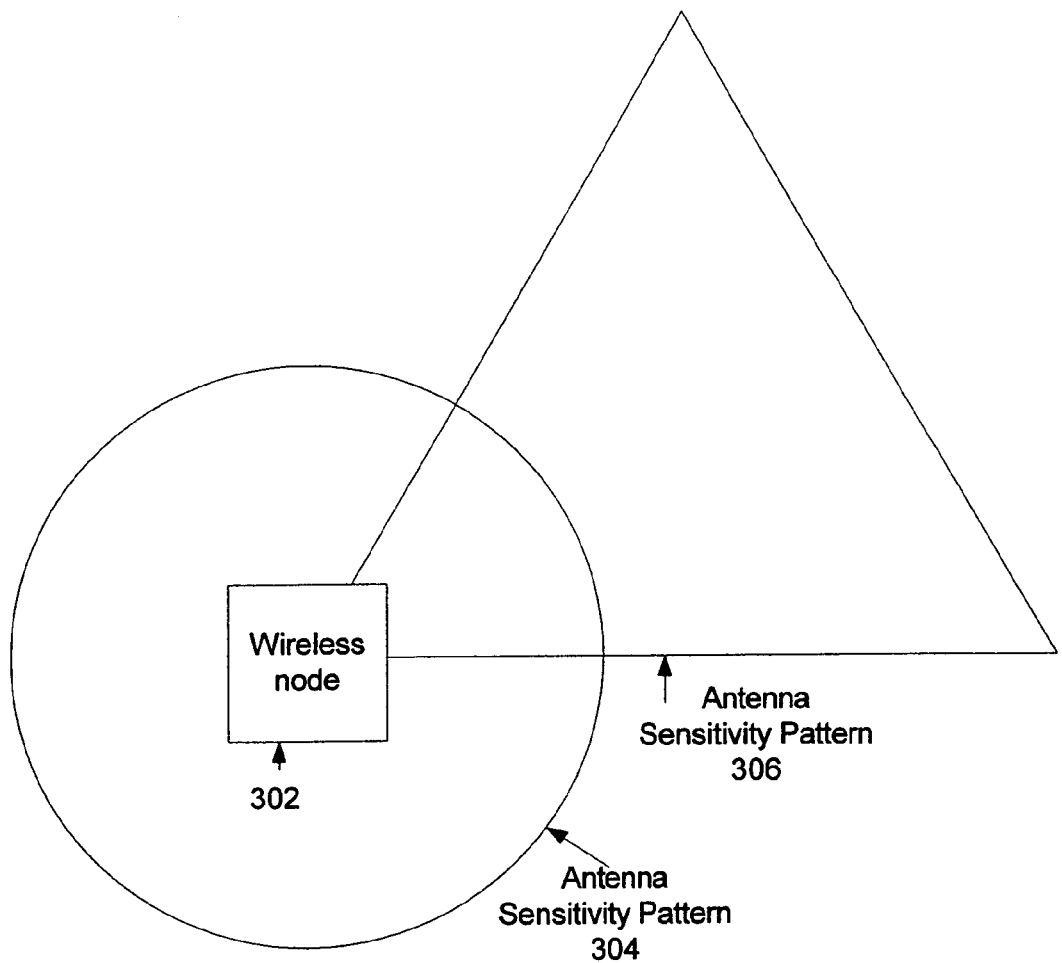
FIG. 3 is a block diagram illustrating the concept of antenna sensitivity patterns.

Turning to FIG. 3, a wireless node is shown with two antenna sensitivity patterns. Antenna sensitivity pattern 304 radiated power equally in all directions and is referred to as omni directional. Antenna sensitivity pattern 306 has a much narrower transmission pattern but increased range in the direction in which the antenna sensitivity pattern is pointed. The width of the sensitivity pattern is known as the beam width. It is well known in the art of antenna design that range and beam width always have a reciprocal relationship. Therefore, wireless node 302 can transmit and receive signals with greater range using the narrower beam width of antenna sensitivity pattern 306 then when using antenna sensitivity pattern 304.

Several methods are known to implement antennas with narrow beam widths. One common method is the use of antenna arrays. An antenna array uses two or more antennas with a predefined spacing between the antenna elements. By changing the amplitude and phase of the signal transmitted to or received from the array, the sensitivity pattern of the antenna can be dynamically changed under electronic control. The dynamic control of the antenna sensitivity pattern allows this sensitivity pattern to be altered quickly and in a well controlled manner.

Figure 4:
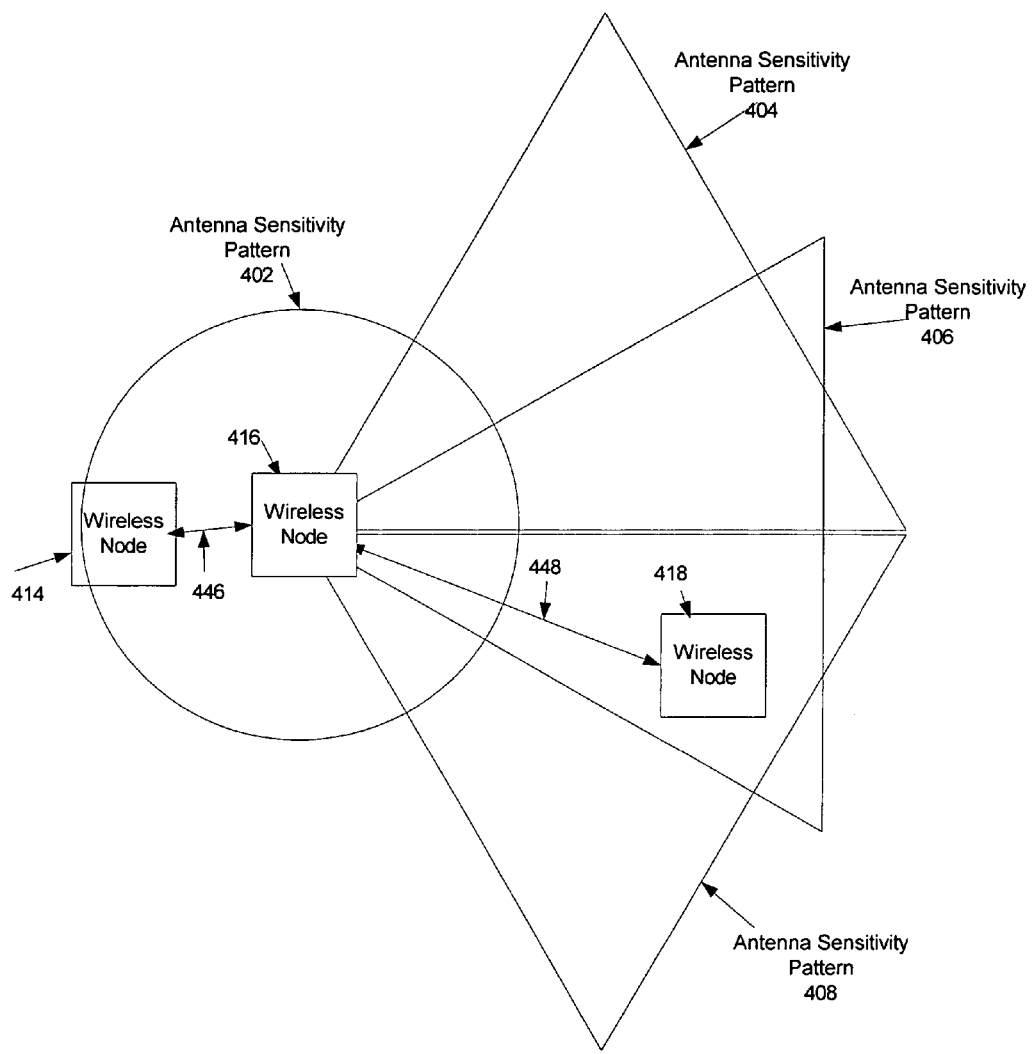
FIG. 4 is a block diagram of the use of hooker mode to locate additional wireless nodes to add to the mesh network.

To take advantage of the increased range possible using directional antennas, a method must be devised to determine in which direction to favorably increase the sensitivity patterns of the antenna. Turning to FIG. 4, consider wireless node 416 which is equipped with an antenna array or similar antenna with electronically controllable sensitivity pattern. Wireless node 416 starts with an omni directional antenna sensitivity pattern 402. With this pattern, wireless nodes 416 and 414 are within range and thus can establish a communication link. With antenna sensitivity pattern 402, no other wireless nodes are visible to wireless node 416. At some point in time, wireless node 416 can switch to antenna sensitivity pattern 404 to search for other wireless nodes. Once the antenna has switched to antenna sensitivity pattern 404, wireless node 416 transmits a query. This query will be answered by any other wireless node within range given the use of antenna sensitivity pattern 404. Because no wireless nodes are within this range, no response to the query will be received and after a predetermined period wireless node will note that no wireless nodes are available using antenna sensitivity pattern 404.

After attempting to find wireless nodes using antenna sensitivity pattern 404, wireless node 416 will return to antenna sensitivity pattern 402 and reestablish communication link 446. If no data needs to be exchanged between wireless nodes 414 and 416 needs to be exchanged, wireless node 416 can implement antenna pattern 406. Again, wireless node 416 will transmit a query. Wireless node 418 is now within range of wireless node 416 using antenna sensitivity pattern 406 and will therefore respond to the query. Wireless node 416 receives the response and invites wireless node 418 to join the mesh network. Wireless node 418 joining the network has several advantages. First, the range of the network is extended to include at the least the area covered by wireless node 418. If wireless node 418 is a part of a second mesh network, the increase in range can be substantial. If wireless node 418 is connected to a WAN, an additional point of access to internet may be added. This increases the robustness of the mesh network by providing a additional point of failure before internet access is prevented.

The pattern of wireless node 416 attempting to locate additional wireless nodes to join the existing mesh network can continue until wireless node 416 has tried antenna sensitivity patterns covering all directions. This mode of searching for outlying wireless nodes is referred to herein as hooker mode. Wireless node 416 is not likely to realize any gain in coverage by examining antenna sensitivity patterns in the direction of wireless node 414 as wireless node 414 is highly likely to provide a better connection to any wireless nodes in that direction. Therefore, wireless node 416 can advantageously avoid attempting antenna sensitivity patterns that favor the direction in which other wireless nodes are known to exist.

Figure 5:
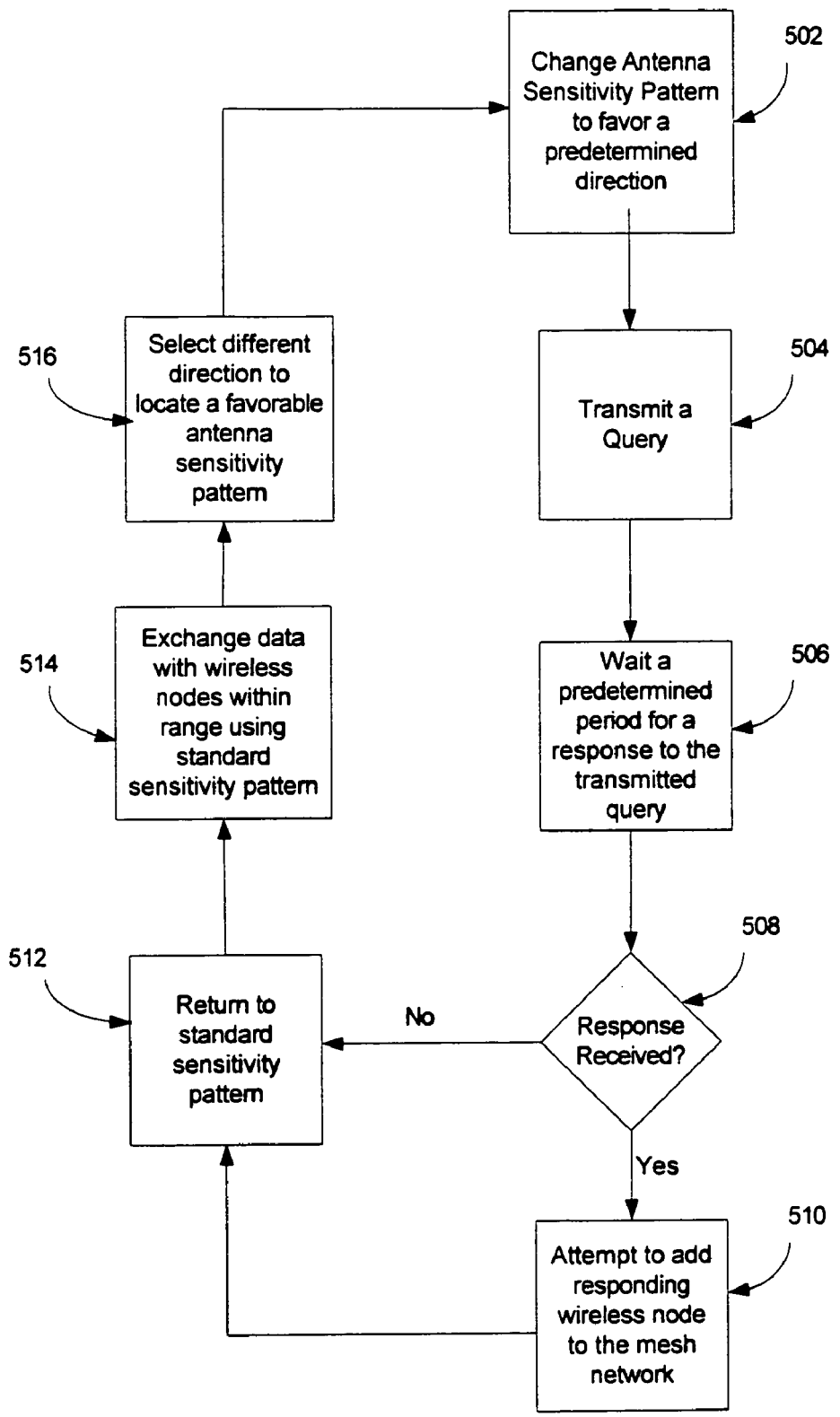
FIG. 5 is a flow diagram of the hooker mode method of locating additional wireless nodes to add to the mesh network.

Referring to FIG. 5, a flow diagram of a "hooker mode" is described. Block 502 provides for changing an antenna's sensitivity pattern to favor a predetermined direction. Block 504 provides for transmitting a query. Block 506 provides for waiting a predetermined period for a response to the transmitted query. Decision block 508 provides for determining whether a response was received. If so, block 510 provides for attempting to add any responding wireless node to the mesh network. If not, block 512 provides for returning to a standard sensitivity pattern. Block 512 is also reached after block 510 attempt to add any responding wireless node. Block 514 provides for exchanging data with wireless nodes within range using standard sensitivity pattern. Block 516 provides for selecting a different direction from the predetermined direction, the different direction being one that the antenna sensitivity pattern favors. Block 516 is shown coupled to block 502 to repeat the method.

Some wireless nodes which are in the center of a well established mesh network such as wireless node 210 in FIG. 2 are virtually surrounded by wireless nodes which are incorporated into the mesh network. Such nodes are unlikely to be able to add any nodes using hooker mode. It is only the outlying wireless nodes which are likely to be able to advantageously use hooker mode to add additional nodes to the existing mesh network.

Figure 6:
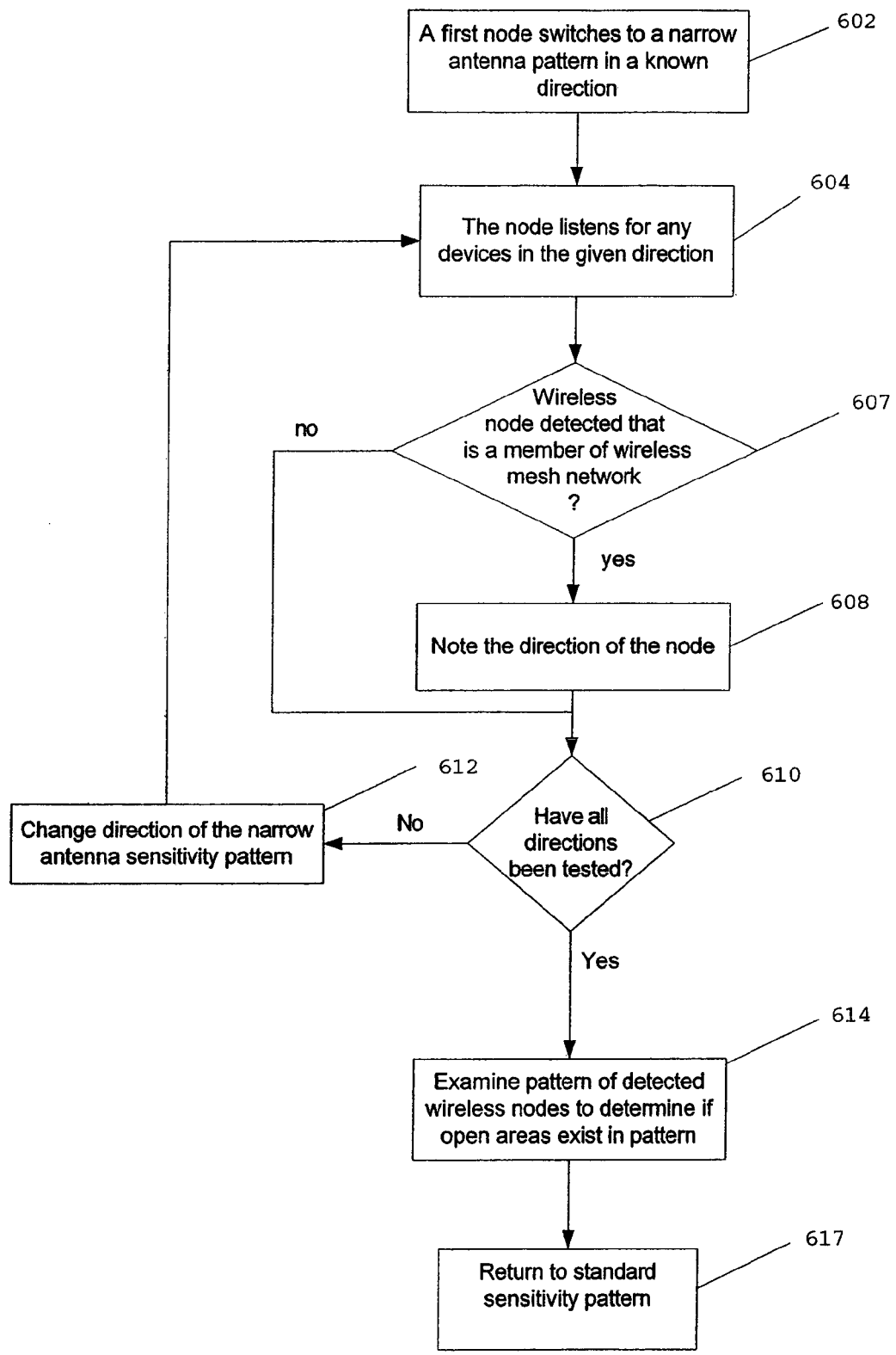
FIG. 6 is a flow diagram of a method for determining if a wireless node is at the edge of a wireless mesh network.

Turning to FIG. 6, a first wireless node which is an established member of a mesh network, first switches to a narrow antenna pattern in a known direction in block 602. The wireless node then listens for any devices in the given direction in block 604. If a second wireless node is detected which is a member of the wireless mesh network in block 606, the direction of the node is noted in block 608. In block 610 a determination is made if all directions have been examined. For example, if the antenna pattern covered a 15 degree arc, then 24 directions would be examined to provide a full 360 degrees of coverage. If all directions have not been examined, then the direction of favored reception of the antenna pattern is changed and blocks 604–610 are repeated. If all directions have been attempted then block 614 provides for examining the pattern of detected wireless nodes in the mesh network. If there is an open area in the pattern of detected wireless nodes, then this direction is noted as a candidate to search for additional wireless nodes to add to the mesh network. The concept of an open area can be determined by the lack of any wireless nodes detected in a given arc-width. For example, the criteria of an open area may be that no wireless nodes in the mesh network are detected in an arc width of 60 degrees. After all directions have been examined, the wireless node returns to a default pattern, for example an omni directional antenna pattern, in block 616. Note that several variations to the above method are anticipated. For example, the wireless node may return to the default pattern after each individual directional pattern is attempted.

The scanning for nodes to add to the mesh network by wireless nodes on the edge of the mesh network can be random or coordinated. The wireless nodes acting independently has the advantage that no overhead is required to coordinate the search. Border nodes can perform a search and add without having to be in synch with any other border node.

In a coordinated search, each border node can be in the hooker mode according to a timed sequence that follows a predetermined pattern or a random pattern or the like. Alternatively, in a coordinated search, all border nodes can be in a hooker mode at the same time. A coordinated search is beneficial by conserving resources, both power resources and RF spectrum resources. Not all nodes will need to search if there are overlaps in coverage which allows some border nodes to be tasked to local service. Another advantage of coordinating a search is that the nodes in the mesh have a reduced self interference in the mesh. In a coordinated search, middle nodes do not produce interference, and only border nodes perform a search. Additionally, a coordinated search can take advantage of a database and report to a database. The database is preferably updated regularly.

Another advantage of performing a coordinated search for lost nodes is to avoid reduced bandwidth during a search. More specifically, a node can disappear which is on a given side of a mesh. When a border node is in a hooker mode, a modification is made to the normal functioning footprint to direct transmission power towards the open area. Redirecting the transmission power can reduce the overlap of a hooker mode node with other nodes in the mesh network resulting in less available bandwidth. Coordinating a search reduces the likelihood of affecting bandwidth and maximizes service available in the original mesh footprint. Another advantage of coordinated searches includes optimizing the number of nodes that need to be searching at to balance the reach of the search against the availability of bandwidth in the mesh. Additionally, a coordinated search is more likely to enable tracking of a mobile node while it passes near or through the mesh network by predicting the mobile node's trajectory.

Figure 7:
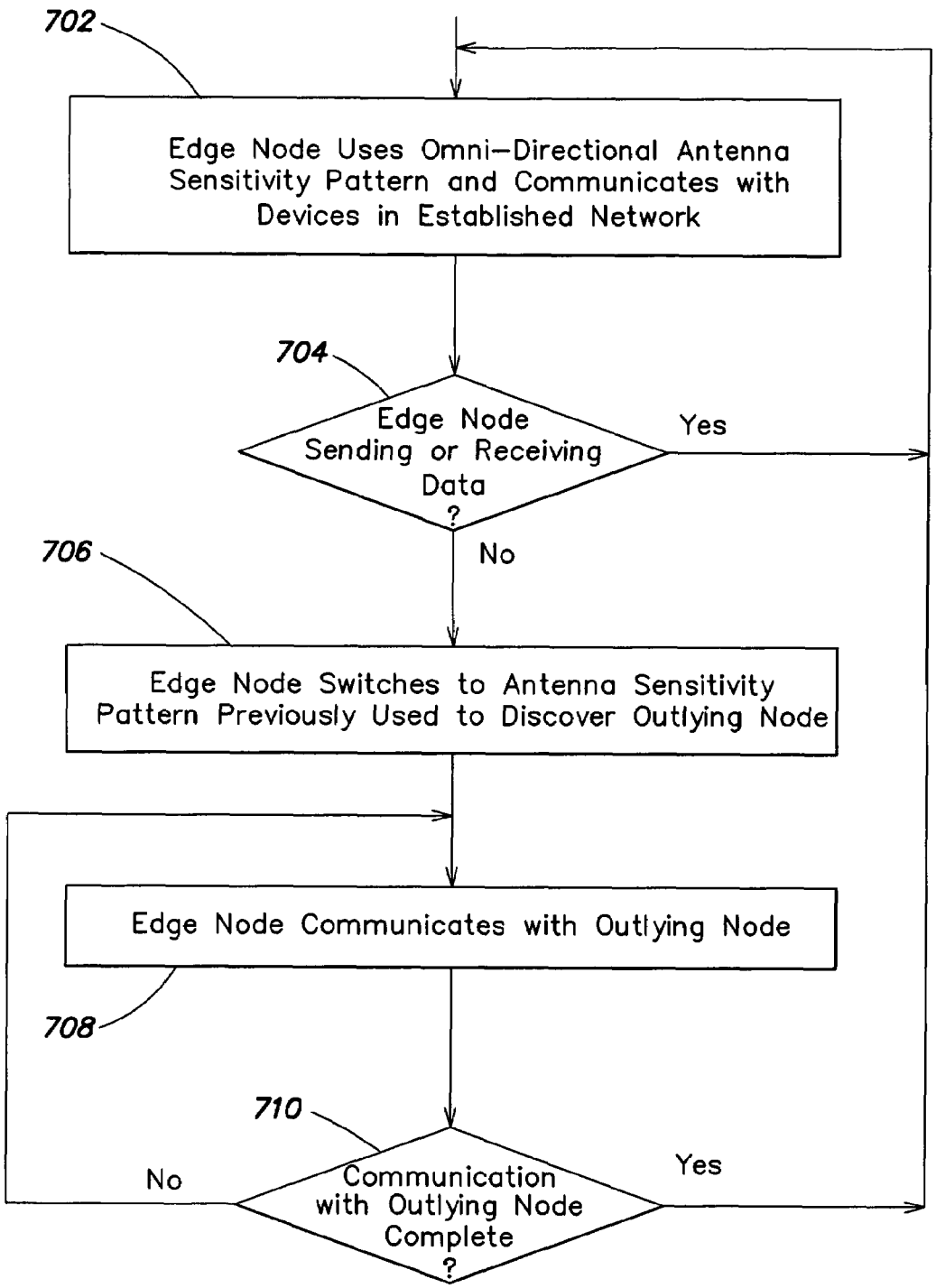
FIG. 7 is a flow diagram of a method for communicating with two or more wireless nodes which require different antenna sensitivity patterns.

Once a wireless node on the edge of the mesh network has added an additional outlying wireless node to the network using a directional antenna sensitivity pattern, the node must switch between two antenna patterns to maintain communication between the outlying wireless node and the rest of the mesh network. This is illustrated in FIG. 7. In block 702 the wireless node on the edge of the mesh network uses an omni directional antenna sensitivity pattern and communicates with devices in the established mesh network. In block 704 the edge node determines whether it is sending or receiving data. If not, then in block 706 the wireless node on the edge of the mesh network switches antenna sensitivity patterns to that previously used to discover the outlying wireless node. If not, block 704 is not satisfied, communication is continued in block 702 using the omni directional antenna pattern. In block 708 the wireless node on the edge of the mesh network communicates with the outlying node. In block 710 the wireless node determines if communication with the outlying node is complete the flow is returned to block 702 and the method repeats. Completion of communication can be determined through several methods as one of skill in the art with the benefit of this disclosure will appreciate. For example, a timeout procedure can be used.

If communications with the outlying node is not complete flow is returned to block 708. In one embodiment, the edge node checks for signal strength from the outlying node and determine whether the link is reliable enough to go back to the original antenna pattern.

In view of the many possible embodiments to which the principles of this invention can be applied, it will be recognized that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A method for adding devices to a wireless mesh network, the method comprising:
    determining if an open area is present in the vicinity of a wireless device in the wireless mesh network;
    if an open area is not present, taking no action to add devices to the wireless mesh network;
    if an open area is present, adjusting an antenna sensitivity pattern of the wireless device in the wireless mesh network to exhibit a directional sensitivity pattern having increased range in a direction of the open area in comparison with an omnidirectional sensitivity pattern to enable discovery of a wireless device that is out of range of the omnidirectional antenna sensitivity pattern;
    transmitting a query using the adjusted antenna sensitivity pattern; and
    if a response to the query transmitted using the adjusted antenna sensitivity pattern is received from a responding wireless device within a predetermined time period, adding the responding wireless device to the mesh network.

2. The method of claim 1 further comprising adjusting the antenna sensitivity pattern one or more times to enable the antenna sensitivity pattern to cover a predetermined spatial area.

3. The method of claim 1 wherein the predetermined time period is fixed.

4. The method of claim 1 wherein two or more nodes in the wireless mesh network adjust the antenna sensitivity pattern in a coordinated manner.

5. The method of claim 1, wherein determining the presence of an open area comprises:
    listening for wireless devices with the antenna sensitivity pattern of the wireless device adjusted to exhibit spatial selectivity in a plurality of directions;
    noting a direction of each detected wireless device to provide a pattern of detected wireless devices;
    comparing the pattern of the detected wireless devices with a criteria for an open area; and
    identifying an open area if the pattern meets the criteria.

6. A wireless device configured to operate in a wireless mesh network, the wireless device comprising:
    a processor;
    a memory coupled to the processor;
    a module operable via the processor, the module configured to determine if an open area is present in the vicinity of the wireless device in the wireless mesh network, if an open area is not present, to take no action to add devices to the wireless mesh network, and if an open area is present, to adjust an antenna sensitivity pattern of the wireless device to exhibit a directional sensitivity pattern having increased range in a direction of the open area in comparison with an omnidirectional sensitivity pattern to enable discovery of a wireless device that is out of range of the omnidirectional antenna sensitivity pattern;
    a transmitter configured to transmit a query using the adjusted antenna sensitivity pattern; and
    a receiver configured to determine whether a response to the query transmitted using the adjusted antenna sensitivity pattern is received from a responding wireless device in a predetermined time period and to add the responding wireless device to the mesh network.

7. The wireless device of claim 6 wherein the module is configured to adjust the antenna sensitivity pattern one or more times to enable the antenna sensitivity pattern to cover a predetermined spatial area.

8. The wireless device of claim 6 wherein the predetermined time period is fixed.

9. The wireless device of claim 6 wherein the wireless device coordinates with one or more additional wireless devices in the wireless mesh network to adjust the antenna sensitivity pattern.

10. The wireless device of claim 6, wherein determining the presence of an open area comprises:
    listening for wireless devices with the antenna sensitivity pattern of the wireless device adjusted to exhibit spatial selectivity in a plurality of directions;
    noting a direction of each detected wireless device to provide a pattern of detected wireless devices;
    comparing the pattern of the detected wireless devices with a criteria for an open area; and
    identifying an open area if the pattern meets the criteria.

11. A computer readable medium having computer-executable instructions to perform acts for adding devices to a wireless mesh network, the acts comprising:
    determining if an open area is present in the vicinity of a wireless device in the wireless mesh network;
    if an open area is not present, taking no action to add devices to the wireless mesh network;
    if an open area is present, adjusting an antenna sensitivity pattern of the wireless device in the wireless mesh network to exhibit a directional sensitivity pattern having increased range in a direction of the open area in comparison with an omnidirectional sensitivity pattern to enable discovery of a wireless device that is out of range of the omnidirectional antenna sensitivity pattern;
    transmitting a query using the adjusted antenna sensitivity pattern; and
    if a response to the query transmitted using the adjusted antenna sensitivity pattern is received from a responding wireless device within a predetermined time period, adding the responding wireless device to the mesh network.

12. The computer readable medium of claim 11 wherein the acts further comprise adjusting the antenna sensitivity pattern one or more times to enable the antenna sensitivity pattern to cover a predetermined spatial area.

13. The computer readable medium of claim 11 wherein the predetermined time period is fixed.

14. The computer readable medium of claim 11 wherein two or more nodes in the wireless mesh network adjust the antenna sensitivity pattern in a coordinated manner.

15. The computer readable medium of claim 11, wherein determining the presence of an open area comprises:
   listening for wireless devices with the antenna sensitivity pattern of the wireless device adjusted to exhibit spatial selectivity in a plurality of directions;
   noting a direction of each detected wireless device to provide a pattern of detected wireless devices;
   comparing the pattern of the detected wireless devices with a criteria for an open area; and
   identifying an open area if the pattern meets the criteria.

* * * * *